United States Patent
Mraz et al.

(10) Patent No.: US 9,306,953 B2
(45) Date of Patent: Apr. 5, 2016

(54) SYSTEM AND METHOD FOR SECURE UNIDIRECTIONAL TRANSFER OF COMMANDS TO CONTROL EQUIPMENT

(71) Applicant: Owl Computing Technologies, Inc., Ridgefield, CT (US)

(72) Inventors: Ronald Mraz, South Salem, NY (US); Gabriel Silberman, Hastings on Hudson, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 191 days.

(21) Appl. No.: 13/770,494

(22) Filed: Feb. 19, 2013

(65) Prior Publication Data
US 2014/0237372 A1   Aug. 21, 2014

(51) Int. Cl.
*H04L 29/06* (2006.01)
*H04L 29/08* (2006.01)

(52) U.S. Cl.
CPC ............ *H04L 63/104* (2013.01); *H04L 67/125* (2013.01)

(58) Field of Classification Search
CPC ............................... G06F 15/177; G06F 3/048
See application file for complete search history.

(56) References Cited

U.S. PATENT DOCUMENTS

| | | | |
|---|---|---|---|
| 5,638,446 A | 6/1997 | Rubin | |
| 5,703,562 A | 12/1997 | Nilsen | |
| 5,745,679 A | 4/1998 | Mercer | |
| 5,995,982 A | 11/1999 | Mercer | |
| 6,151,708 A | 11/2000 | Pedrizetti et al. | |
| 6,381,742 B2 | 4/2002 | Forbes et al. | |
| 6,430,608 B1 | 8/2002 | Shaio | |
| 6,694,434 B1 | 2/2004 | McGee et al. | |
| 6,789,255 B1 | 9/2004 | Pedrizetti et al. | |
| 6,883,168 B1 | 4/2005 | James et al. | |
| 6,944,634 B2 | 9/2005 | Hertling et al. | |
| 6,970,866 B1 | 11/2005 | Pravetz et al. | |

(Continued)

FOREIGN PATENT DOCUMENTS

| | | |
|---|---|---|
| EP | 20457520 A2 | 8/2009 |
| EP | 2430548 A1 | 11/2010 |

(Continued)

OTHER PUBLICATIONS

UK Intellectual Property Office, Examination Report under Section 18(3), Jul. 17, 2014.

(Continued)

*Primary Examiner* — Jennifer To
*Assistant Examiner* — Xuyang Xia
(74) *Attorney, Agent, or Firm* — John S. Economou

(57) ABSTRACT

A system for securely transferring commands to a recipient device. An access interface allows a user to enter a command for the recipient device. The access interface only allows the user to enter commands within a subset of commands associated with a role assigned to the user. The control interface receives information, i.e., the command entered by the user and the associated user role, from the access interface. The control interface outputs, to the manifest engine, the information and a manifest table which identifies each role and the subset of commands associated with each role. The manifest engine compares the information with the contents of the received manifest table, and, if the command entered by the user corresponds to a command within the set of commands associated with the role assigned to the user, forwards the command to the recipient device.

7 Claims, 6 Drawing Sheets

(56) References Cited

U.S. PATENT DOCUMENTS

| | | |
|---|---|---|
| 7,089,248 B1 | 8/2006 | King et al. |
| 7,092,972 B2 | 8/2006 | Kashyap |
| 7,196,661 B2 | 3/2007 | Harvey |
| 7,263,528 B2 | 8/2007 | Haff et al. |
| 7,280,956 B2 | 10/2007 | Cross et al. |
| 7,310,629 B1 | 12/2007 | Mendelson et al. |
| 7,373,345 B2 | 5/2008 | Carpentier et al. |
| 7,386,574 B2 | 6/2008 | Abe et al. |
| 7,472,272 B2 | 12/2008 | Stamos et al. |
| 7,483,958 B1 | 1/2009 | Elabbady et al. |
| 7,502,754 B2 | 3/2009 | Campbell et al. |
| 7,558,797 B2 | 7/2009 | Li |
| 7,610,355 B2 | 10/2009 | Azuma et al. |
| 7,668,868 B1 | 2/2010 | King et al. |
| 7,675,867 B1 * | 3/2010 | Mraz et al. .................... 370/254 |
| 7,707,424 B2 | 4/2010 | Axelsson |
| 7,756,826 B2 | 7/2010 | Bots et al. |
| 7,765,411 B2 | 7/2010 | Hennessey et al. |
| 7,805,468 B2 | 9/2010 | Takahashi |
| 7,814,551 B2 | 10/2010 | Darweesh et al. |
| 7,865,575 B2 | 1/2011 | Leitheiser |
| 7,874,015 B2 | 1/2011 | Aaron |
| 7,930,538 B1 | 4/2011 | Israel et al. |
| 7,934,091 B2 | 4/2011 | Stamos et al. |
| 7,992,209 B1 * | 8/2011 | Menoher et al. ................ 726/26 |
| 8,010,680 B2 | 8/2011 | Crawford |
| 8,024,306 B2 | 9/2011 | Palliyil et al. |
| 8,024,462 B1 | 9/2011 | Zhu et al. |
| 8,041,946 B2 | 10/2011 | Bunn et al. |
| 8,069,349 B1 | 11/2011 | Israel et al. |
| 8,075,403 B2 | 12/2011 | O'Brien et al. |
| 8,103,870 B2 | 1/2012 | Clower et al. |
| 8,161,104 B2 | 4/2012 | Tomkow |
| 8,176,331 B2 | 5/2012 | Moreillon et al. |
| 8,191,165 B2 | 5/2012 | Aaron |
| 8,196,201 B2 | 6/2012 | Repasi et al. |
| 8,234,350 B1 | 7/2012 | Gu et al. |
| 8,250,235 B2 | 8/2012 | Harvey et al. |
| 8,352,450 B1 | 1/2013 | Mraz et al. |
| 2004/0133548 A1 | 7/2004 | Fielding et al. |
| 2009/0271858 A1 * | 10/2009 | Cooke et al. .................... 726/12 |
| 2010/0281173 A1 * | 11/2010 | Vutukuri et al. .............. 709/228 |
| 2011/0191485 A1 | 8/2011 | Umbehocker |
| 2011/0302629 A1 | 12/2011 | Whitson et al. |
| 2012/0030768 A1 | 2/2012 | Mraz et al. |
| 2012/0144187 A1 | 6/2012 | Wei et al. |
| 2012/0185930 A1 * | 7/2012 | Desai ................. G06F 21/6218 726/13 |

FOREIGN PATENT DOCUMENTS

| | | |
|---|---|---|
| WO | WO2005085971 A1 | 9/2005 |
| WO | WO20100132647 A1 | 11/2010 |
| WO | WO2012012266 A1 | 1/2012 |

OTHER PUBLICATIONS

UK Intellectual Property Office, Combined Search and Examination Report under Sections 17 & 18(3), Dec. 23, 2013 (includes Search Report under Section 17 dated Dec. 20, 2013).

* cited by examiner though ### simulated ### —

SYSTEM AND METHOD FOR SECURE UNIDIRECTIONAL TRANSFER OF COMMANDS TO CONTROL EQUIPMENT

FIELD OF INVENTION

The present invention relates generally to secure unidirectional transfer of digital information, in particular, command information, to one or more control devices. More particularly, the present invention relates to the use of manifest tables and one-way, hardware-enforced information transfers, to secure both the provider and recipients of such command information.

BACKGROUND OF THE INVENTION

Operational environments exist in many forms and cover a wide variety of equipment, from something as simple as thermostats controlling a room's temperature, to a command and control center running a complex industrial installation such as an oil refinery, or a sophisticated mission such as flying an unmanned aerial vehicle. Despite this wide variation, an operational environment usually uses a collection of control devices, including for example a Programmable Logic Controller (PLC), to monitor the status and conditions of many of the systems (and subsystems) and other devices under its control, as well as to modify the behavior and/or the monitoring modalities of the device (e.g., PLC). Remote monitoring and behavior changes can be accomplished by reading from and writing to specific memory locations (registers) in the control device, respectively, using for example a Modbus protocol in a Supervisory Control and Data Acquisition (SCADA) system. Also, the monitored values may be used by the control device to independently modify the behavior of the equipment under its control, using a previously stored program in local memory. For the purpose of this disclosure, the modification of a stored program on a control device is considered equivalent to the writing a set of commands to specific memory locations on the same device.

In most cases, either because the control device was designed to operate in a protected environment or because the security risks were deemed negligible, there is little or no built-in protection when the apparatus is connected to a network or is otherwise accessible in a non-controlled fashion, either to accept commands or to output status information. Most current solutions for securing an existing control device use physical isolation or software-based firewalls to protect the network connected to the apparatus. As a result, it is possible to compromise the control device via a network or other external connection (termed herein "Network Risk"), to effectively subvert the control device operation, for example, by allowing malware to be introduced which issues commands that change the operational parameters of the controlled equipment or otherwise render the equipment unusable, while optionally giving out erroneous status readings to hide such actions.

Assuming the Network Risk is somehow mitigated, there is still an additional security exposure if physical access is gained to the operational environment, as would be the case if an individual is able to enter a control room or connect to an internal network linked to the control device. Examples of such exposures include the subversion or impersonation of legitimate employees, as well as physical break-ins (termed herein as "Insider Risk"). Insider Risk relies on the lack of further safeguards, once the access or connection is accomplished, to protect the control device from accepting commands to subvert its operation or exfiltrate information from associated control equipment. Properly addressing the Network Risk will result in the secure delivery of commands from an authorized source, while properly dealing with Insider Risk will ensure that the authorized source has not been compromised and will only issue valid commands.

User IDs and associated passwords are common methods for addressing the Insider Risk in computing systems and are also routinely used in operational environments. In some cases, these methods are augmented by the use of biometric features, such as voice or fingerprint. A known weakness of these methods is that there is no practical limitation to what can be done once access to a system is obtained. Role-Based Access Control (RBAC) methods address this weakness by restricting access to information and ability to perform operations to a subset of the resources in a system, depending on the particular role or roles an individual has in an organization. RBAC methods provide an additional layer of protection for the various assets and components of an operational environment, even when these are located in the same physical space as no-operational systems or share computational resources with them. Furthermore, RBAC methods simplify the process of changing access permissions as a person changes roles within an organization, as the permissions are linked to a role and not a person.

The Network Risk and/or the Insider Risk may be deemed unacceptable for certain environments because the result of either operational failure or information leakage have intolerable consequences.

Alternative network security methods and devices based on unidirectional data transfer have been devised to address the network security concern. For example, U.S. Pat. No. 5,703,562 to Nilsen ("the '562 patent"), the contents of which are hereby incorporated by reference in its entirety, provides an alternative way to address the network security concern. The '562 patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

Any data link that strictly enforces the unidirectionality of data flow is called a one-way link or one-way data link. In other words, it is physically impossible to send information or data of any kind through a one-way data link in the reverse direction. A one-way data link may be hardware-based, software-based, or based on some combination of hardware and software.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms 101 and 102 (respectively, "the send platform" and "the receive platform") are connected to the unsecured external network 104 ("the source network") and the secure network 105 ("the destination network"), respectively. The send platform 101 is connected to the receive platform 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the send platform and to an optical receiver on the receive platform.

A configuration such as the one shown in FIG. 1 physically enforces one-way data transfer at both ends of the optical fiber connecting the send platform 101 to the receive platform 102, thereby creating a truly unidirectional data transfer link between the source network 104 and the destination network 105. One-way data transfer systems based on a one-way data link are designed to transfer data or information in only one direction, making it physically impossible to transfer any kind of data, such as handshaking protocols, error messages, or busy signals, in the reverse direction. Such physically imposed unidirectionality in data flow cannot be hacked by a programmer, as is often done with firewalls, where unidirectional rules are software-protected (e.g., password authentication, etc.). Accordingly, the one-way data transfer system based on a one-way data link ensures that data residing on the isolated destination secure computer or network is maximally protected from any undesired and unauthorized disclosure. Alternatively, the source network is isolated from any malware contained in the destination network.

As described in U.S. Pat. No. 8,352,450, issued on Jan. 8, 2013, the contents of which are incorporated herein by reference, files based on various conventional transport protocols may be transferred across a one-way data link under suitable arrangements. The following example illustrates transfer of files based on the Transmission Control Protocol (TCP) across a one-way data link. FIG. 2 is a functional block diagram that schematically illustrates implementation of a TCP-based secure file transfer across a single one-way data link in a one-way data transfer system 200.

Construction of the conventional TCP sockets requires bilateral communications since it requires an acknowledgement channel from the receive node to the send node. Accordingly, the conventional TCP/IP protocol cannot be implemented directly in a one-way data transfer system based on a one-way data link, since no bilateral "hand shaking" is allowed over the one-way link due to physical enforcement of unidirectionality of data flow. Instead, the one-way data transfer system 200 illustrated in FIG. 2 uses a TCP simulation application called TCP proxy, which is preferably a TCP/IP socket-based proxy software, but may also be hardware-based or based on a suitable combination of software and hardware, to simulate the TCP/IP protocol across the one-way data link 207.

In FIG. 2, a TCP server proxy 205 fully implements the TCP/IP protocol in its bilateral communications 203 with the upstream TCP file client 202 residing in a source platform 201. The TCP server proxy 205 may reside within the send node 204 as shown in FIG. 2, or alternatively, may be separate from but coupled to the send node 204. After the TCP server proxy 205 receives files from the TCP file client 202, the send node 204 sends the files through its interface 206 to the one-way data link 207. After the receive node 208 receives the files through its interface 209 from the one-way data link 207, the TCP client proxy 210 communicates under the full implementation of the TCP/IP protocol with a TCP file server 213 residing in a destination platform 212 and forwards the received files to the TCP file server 213. The TCP client proxy 210 may reside within the receive node 208 as shown in FIG. 2, or alternatively, may be separate from but coupled to the receive node 208.

In certain situations, it would be advantageous to use a one-way data link with an independent link layer protocol for one-way transfer so that non-routable point to point communications with a true IP protocol break can be enforced. With these properties, data packets or files cannot be accidentally routed in the network and other protocols (such as printer protocols, etc.) will not route across the one-way data link. An exemplary configuration enforcing such non-routable point to point communications with a true IP protocol break can be implemented in the one-way file transfer system 200 of FIG. 2. The TCP-based file transfer system 200 may be configured to prohibit transmission of IP information across the one-way data link 207. When the TCP server proxy 205 receives a file from the TCP file client 202, it removes the IP information normally carried in the file data packet headers under the TCP/IP protocol and replaces it with pre-assigned point-to-point channel numbers, so that no IP information is sent across the one-way data link 207. Instead, predetermined IP routes may be defined at the time of the configuration of the system 200 in the form of channel mapping tables residing in the TCP server proxy 205 associated with the send node 204 and the TCP client proxy 210 associated with the receive node 208. The send node 204 then sends the files with the pre-assigned channel numbers to the receive node 208 through its interface 206 across the one-way data link 207, which are received by the receive node 208 through its interface 209. Upon receipt of the files, the TCP client proxy 210 then maps the channel numbers from the received files to the corresponding predetermined IP address of a destination platform 212, to which the files are forwarded.

For the security of the overall one-way file transfer system 200, the IP address-to-channel number mapping table residing in the send node 204 may be different from the channel number-to-IP addressing mapping table residing in the receive node 208, and furthermore, neither table may be re-constructed on the basis of the other table. Neither table alone reveals the overall IP routing configuration from the source platform 201 to the destination platform 212. In this way, the IP information of the destination platform 212 may remain undisclosed to the sender at the source platform 201 and the security of the overall system 200 can be maintained.

Under the conventional TCP/IP protocol, the acknowledgement mechanism requiring bilateral communications may provide means for error detection. However, the one-way data link 207 forecloses such means. Instead, the one-way data transfer system 200 may assure file integrity by applying, for example, a hash algorithm such as MD5 to each file being transferred over the one-way data link 207. The send node 204 calculates an MD5 hash number for the file and sends the resulting hash number along with the file to the receive node 208 over the one-way data link 207. When the receive node 208 receives the file, it may re-calculate a hash number for the received file and compare the result with the hash number calculated by the send node 204. By comparing these results, the receive node 208 may be able to determine as to whether any error has occurred during the file transfer across the one-way data link.

It is an object of the present invention to provide a secure method for sending commands or programs to be executed by a control apparatus, such as a PLC or similar computing device, to monitor the status and/or modify the behavior of industrial and other equipment.

Other objects and advantages of the present invention will become apparent from the following description.

SUMMARY OF THE INVENTION

The present invention provides a system for securely transferring commands to a recipient device. In an embodiment, the system includes an access interface, a control interface and a manifest engine. The access interface is configured to allow a user to enter a command for transfer to a recipient device. The command comprises one of a set of commands. Each user is assigned one of a predetermined set of roles. Each role is associated with a subset of the set of commands. The access interface is configured to restrict the user to be able to enter only commands within the predetermined subset of commands associated with the assigned role. The control interface is coupled to receive information from the access interface. The information comprises the command entered by the user and the assigned role of the user. The control interface is configured to output the information and a manifest table. The manifest table identifies each role and the subset of commands associated with each role. The manifest engine is coupled to the control interface and is configured to: receive the information and manifest table from the control interface; to compare the information with the contents of the received manifest table; and, if the command entered by the user corresponds to a command within the set of commands associated with the role assigned to the user, to forward the command on an output to the recipient device.

Preferably, the manifest engine comprises a manifest engine TX server, a data link, and a manifest engine RX server. The manifest engine TX server has an input configured to receive the information and manifest table from the control interface and an output. The manifest engine TX server is further configured to compare the information with the contents of the received manifest table, and, if the command entered by the user corresponds to a command within the set of commands associated with the role assigned to the user, to forward the command on the output. The data link has an input coupled to the output of the manifest engine TX server and an output. The manifest engine RX server has an input coupled to the output of the data link and an output coupled as the output of the manifest engine. The manifest engine RX server is configured to receive the command from the manifest engine TX server via the data link and to output the command on the output. In a further preferred embodiment, the data link is a one-way data link in which data may only pass from the input to the output. In a still further embodiment, the control interface has two outputs, a first output for outputting the information and a second output for outputting the manifest table, and the manifest engine has two corresponding inputs, a first input coupled to the first output of the control interface to receive the information and a second input coupled to the second output of the control interface to receive the manifest table.

Still further, the recipient device may preferably include an output for providing status information and the control interface may be coupled to the output of the recipient device via a separate connection. The control interface may be configured to monitor the recipient device based on status information received from the recipient device. Preferably, the separate connection may be a one-way data link in which information may only pass from the output of the recipient device to the control interface.

In a further embodiment, the recipient device has an output for providing status information and the system includes a second manifest engine having a first input coupled to the output of the recipient device, a second input coupled to receive a second manifest table from the control interface, and an output coupled to the control interface. The second manifest table identifies a predetermined set of status information. The second manifest engine is configured to compare the status information received from the recipient device with the contents of the received second manifest table, and, if the status information corresponds to status information within the predetermined set of status information identified in the manifest table, to forward the status information on the output. The second manifest engine comprises a second manifest engine TX server, a second data link, and a second manifest engine RX server. The second manifest engine TX server has an input coupled to the output of the recipient device and an output, and is configured to forward any status information received at the input to the output. The second data link has an input coupled to the output of the second manifest engine TX server and an output. The second manifest engine RX server has a first input coupled to the output of the second data link, a second input coupled to the control interface and an output coupled to the control interface. The second manifest engine RX server is configured to receive the second manifest table via the second input, to receive status information forwarded by the second manifest engine TX server via the second data link, to compare the received status information with the contents of the received second manifest table and, if the received status information is identified in the second manifest table, to forward the received status information to the control interface via the output. Preferably, the second data link may be a one-way data link in which data may only pass from the input to the output.

Finally, the present invention provides a system for securely transferring commands to a recipient device. The system includes a terminal configured to allow a user to initiate a secure remote session via a link. The system also includes an access interface coupled to the link and configured to allow the user to enter, via the secure remote session, a command for transfer to a recipient device via an output. The command comprises one of a set of commands. Each user is assigned one of a predetermined set of roles. Each role is associated with a subset of the set of commands. The access interface is configured to restrict the user to be able to enter only commands within the predetermined subset of commands associated with the assigned role. Finally, the system includes a data link having an input coupled to the output of the access interface and an output coupled to the recipient device. The data link may be a one-way data link in which data may only pass from the input to the output.

BRIEF DESCRIPTION OF THE DRAWINGS

The above and related objects, features and advantages of the present invention will be more fully understood by reference to the following, detailed description of the preferred, albeit illustrative and exemplary, embodiments of the present invention when taken in conjunction with the accompanying figures, wherein.

DETAILED DESCRIPTION OF THE EXEMPLARY EMBODIMENTS

In the present disclosure, like reference numbers refer to like elements throughout the drawings, which illustrate various exemplary embodiments of the presently disclosed system. Although the presently disclosed system will be discussed with reference to various illustrated examples, these examples should not be read to limit the broader spirit and scope of the present invention.

Figure 1:
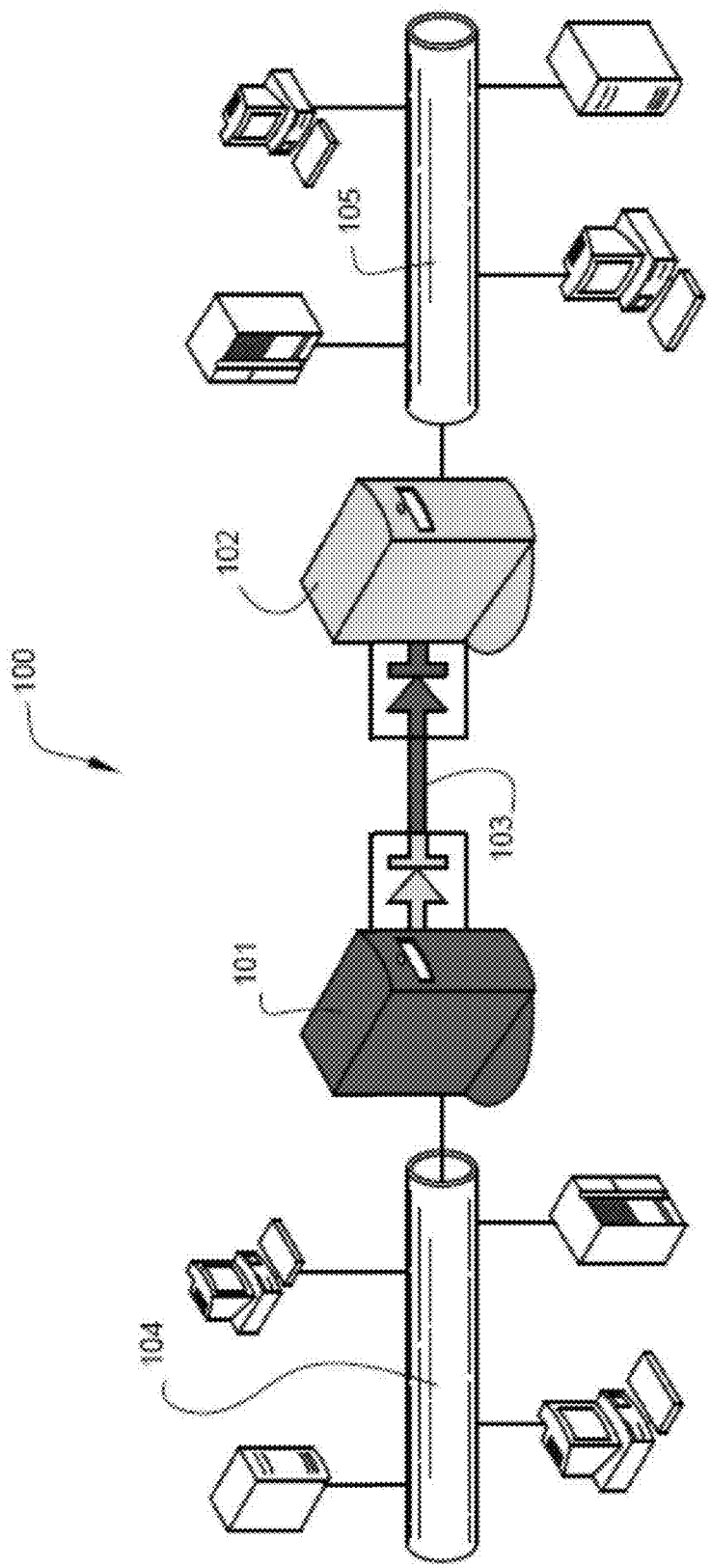
FIG. 1 schematically illustrates an example of a secure one-way data transfer system using a one-way data link.
Figure 2:
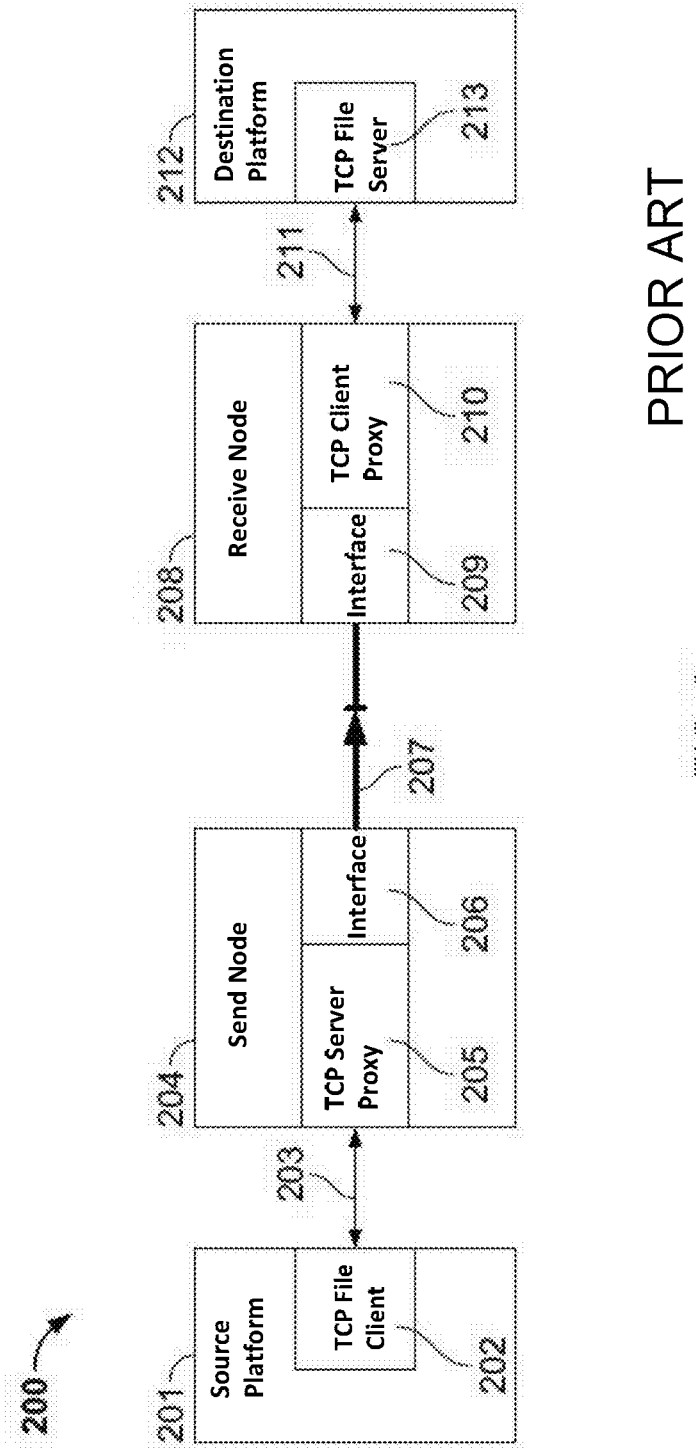
FIG. 2 is a functional block diagram that schematically illustrates TCP-based file transfer across a one-way data link.
Figure 3:
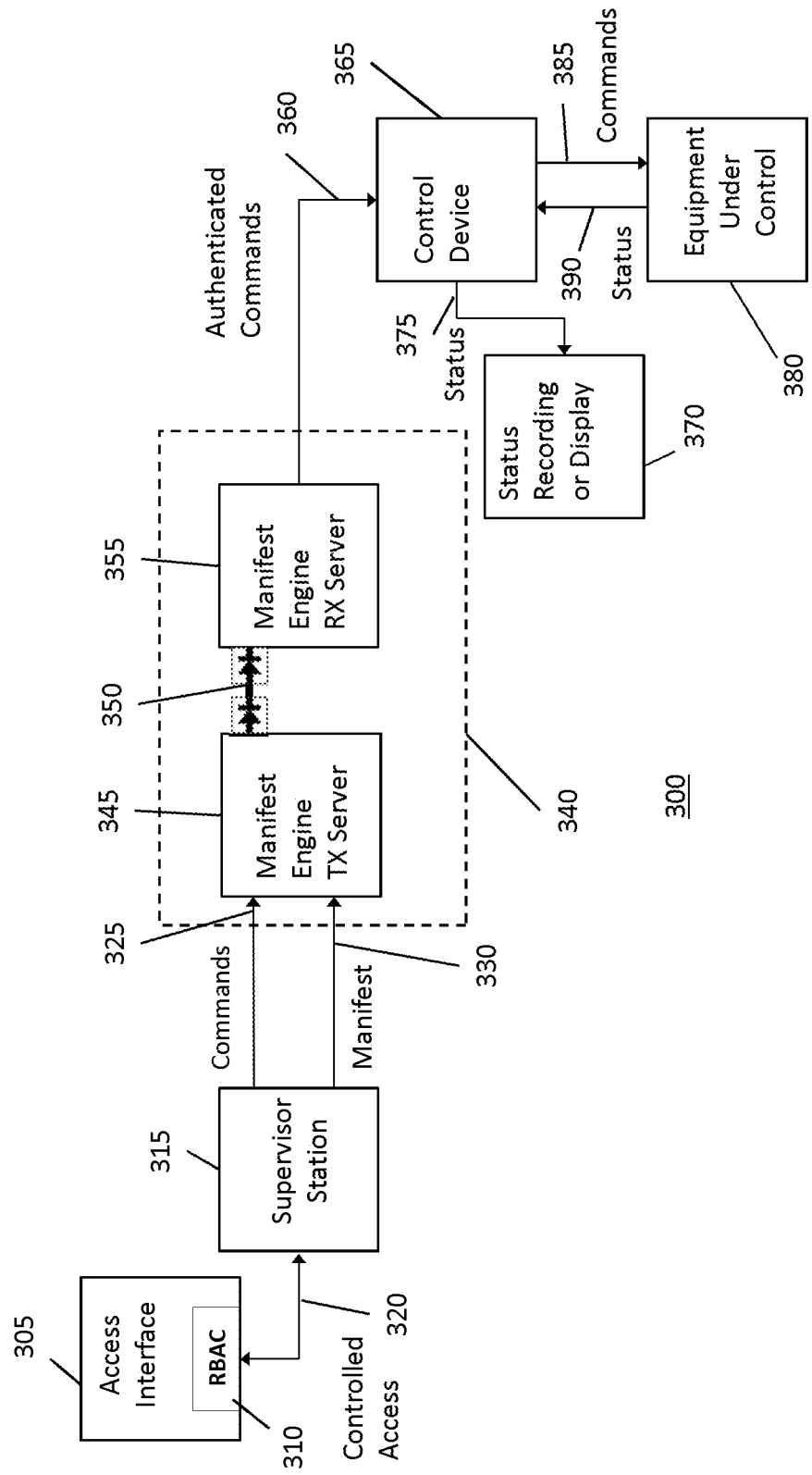
FIG. 3 is a block diagram of a first exemplary embodiment of the present invention.

Referring now to the drawings and in particular to FIG. 3, a system 300 is shown which, in operation, relies upon an RBAC module 310 and a manifest transfer engine 340 to ensure that only authenticated commands may be provided to a control device 365 (e.g., a PLC). The system includes an access interface 305 (also known in the art as a human-machine interface or HMI), which includes the RBAC module. A supervisor station 315 is coupled to the HMI 305 via a link 320. As one of ordinary skill in the art will readily recognize, HMI 305 may be separate from or combined with supervisor station 315. Supervisor station 315 is a control interface which is coupled to a manifest transfer engine 340 via a command link 325 and a manifest link 330. Alternatively, command link 325 and manifest link 330 may be combined, so long as the manifest passed to the manifest transfer engine 340 is properly identified (e.g., tagged) to distinguish from commands. The manifest transfer engine 340 includes a manifest engine TX server 345, a one-way data link 350 and a manifest engine RX server 355. The operation of the manifest transfer engine 340 is discussed in detail below, but in overview, only received commands which are specifically identified (and thus authenticated) on the manifest are output to link 360. A control device 365 is coupled to link 360 to receive the authenticated commands. Link 360 may be any conventional type of link used to provide commands to a control device. For example, in the case where control device 365 is a PLC, link 360 may be RS-232, EIA-485 or Ethernet, for example. Control device 365 is typically linked to equipment under control 380 via a command link 385 and a status link 390 (either separately as shown, or together, depending on the type of equipment 380 being controlled). Control device 365 may also be coupled to a status output device 370 via a link 375. Status output device 370 may be a display or memory storage device for either viewing or storing status information.

HMI 305 includes an RBAC module 310 which supervises the login process and provides each user with access to the system 300 based upon a predefined one of a plurality (set) of possible roles. For example, control device 365 may be configured to receive a particular set of commands. Thus, the RBAC module 310 may provide a system administrator user with the ability to issue the full set of commands, while a system operator may only be provided with the ability to issue a subset of such commands. As discussed below, it may be desirable to configure the RBAC module 310 to prevent all users, regardless of the role, to perform some commands. Commands which are issued from HMI 305 may be tagged with either the associated ID of the user issuing such commands or the particular role assigned to such user, or both the associated ID and the particular role. Furthermore, as one of ordinary skill will readily recognize, a command may include both the particular command and parameters associated with carrying out that command. For the purposes of this disclosure, the term "command" is used to refer both to the particular command (e.g., when comparing an entered command with the commands listed in the manifest) or to the complete command (e.g., when discussing transmission of a command).

The supervisor station 315 maintains the current manifest, which may be preconfigured, or generated or altered via HMI 305 or a separate HMI not shown. The current manifest identifies the particular set of commands available for control device 365. In some cases, it may be desirable to omit certain commands within the full set (e.g., a reset command), and thus such command or commands would not be included within the current manifest. The manifest may also include, for each command, an identification of the particular roles allowed to issue such command and/or the ID of users allowed to issue such command.

The manifest transfer engine 340 may comprise a manifest engine TX server 345, a manifest engine RX server 355, and a one-way data link 350 enforcing unidirectional data flow from the TX server 345 to the RX server 355. The TX server 345 of the manifest transfer engine 340 is configured to receive a manifest table from supervisor station 315 and store it. The TX server 345 is also configured to receive commands to be transferred across the one-way data link 350 from the user. As further described below, the TX server 345 of the manifest transfer engine 340 performs the manifest filtering by comparing the received commands against the manifest table received from supervisor station 315. Only upon validation based on the manifest table stored in the TX server 345, the user commands are allowed to be transferred to the RX server 355 of the manifest transfer engine 340 via one-way data link 350.

The TX server 345 of the manifest transfer engine 300 may comprise a file client proxy configured to receive user commands and send them across the one-way data link 350 upon validation/authentication. Similarly, the RX server 345 of the manifest transfer engine 340 may comprise a file server proxy configured to receive the user commands from the one-way data link 350 and forward the received user commands to the control device 365.

The manifest transfer engine 340 performs manifest filtering by individually validating each received user command against the manifest table stored in the TX server 345. In one or more embodiments, the TX server 345 compares the user command with the registered commands listed on the manifest table. In the event that the user command is tagged with the user role and/or user ID, TX server 345 also verifies this information in the manifest file (i.e., that the present command may be issued by the associated user role and/or user ID). If there is a match, the command is validated and the TX server 345 allows the user command to be transferred to the RX server 355 via one-way data link 350. On the other hand, if no match is found, the user command is not validated and thus not transferred across one-way data link 350. The incident of finding no match may be logged, and any non-validated user command may be deleted or quarantined for later analysis.

By incorporating the role and/or ID of the individual or entity in the manifest controlling the transfer of commands from the supervisor station 315 to control device 365, this embodiment prevents the transmission of commands to equipment under control 380 by an attacker who has managed to determine (by, e.g., trial and error or reverse engineering) commands for which a valid manifest entry may exist. In a further variant to the FIG. 3 embodiment, further assurance of a command's validity may be attained by providing the TX server 345 with an additional connection to supervisor station 315 to allow TX server 345 to issue a request to supervisor station 315 to certify that a specific user or one with a specific role is currently or recently logged in (e.g., as reflected in a log maintained in supervisor station 315).

Figure 4:
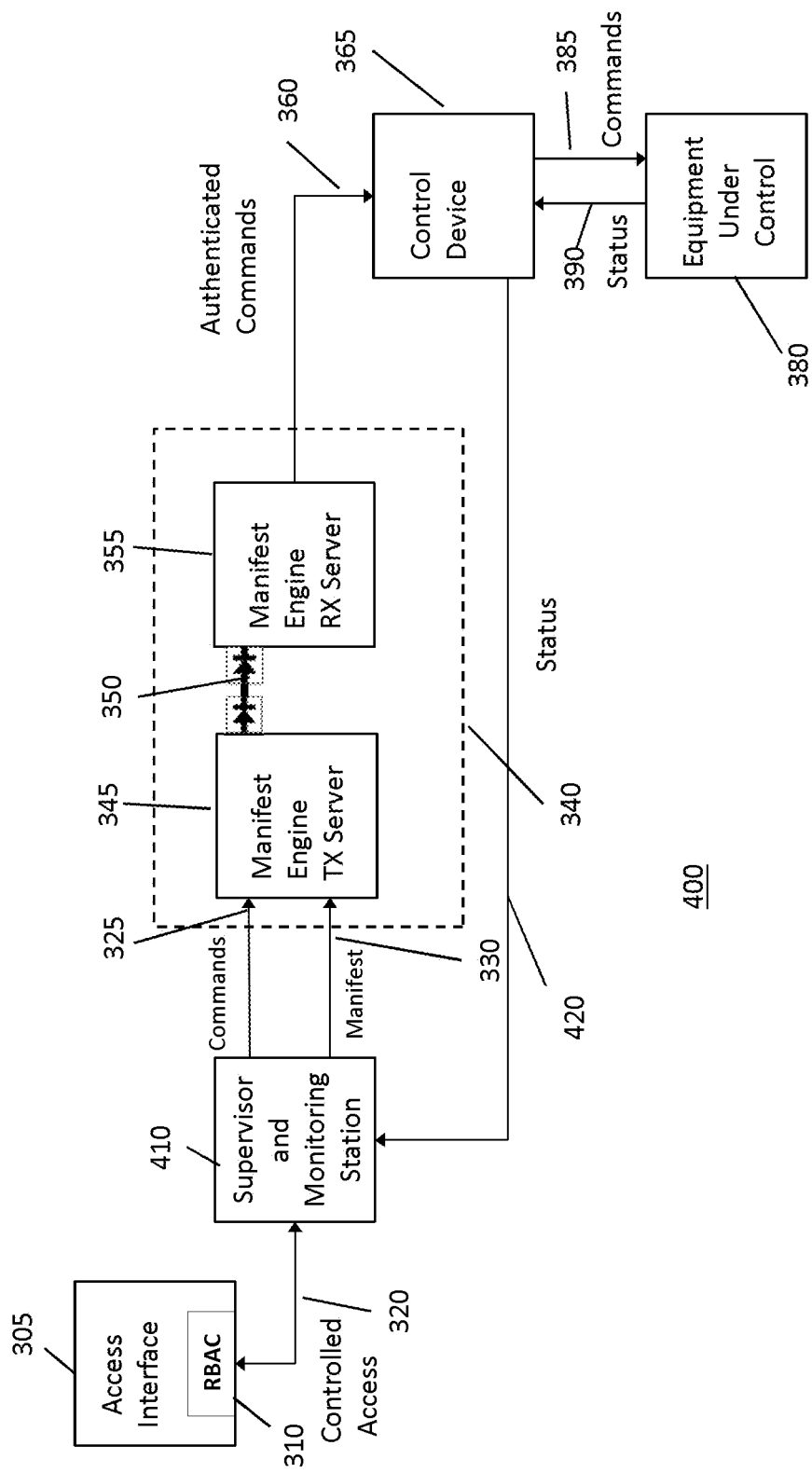
FIG. 4 is a block diagram of a second exemplary embodiment of the present invention.

FIG. 4 illustrates a first alternative embodiment 400 of the system 300 shown in FIG. 3. This alternative embodiment 400 operates in substantially the same way as system 300, with the only change being that the supervisor station 315 is replaced with a supervisor and monitoring station 410 that is separately coupled to the control device 365 via a link 420. Supervisor and monitoring station 410 performs the same functions as supervisor station 315 as discussed above with respect to FIG. 3, and in addition includes monitoring capabilities for displaying and/or storing the status information output by control device 365. In a further embodiment, the link 420 may be a one-way data link which only allows data to be transferred from control device 365 to supervisor and monitoring station 410 and prevents any information to pass along link 420 from supervisor and monitoring station 410 to control device 365.

The FIG. 4 embodiment provides more efficient operation by feeding the status of control device 365 back to supervisor and monitoring station 410. In this manner the status is available visually to a human operator, facilitating the identification of unusual circumstances and proper handling thereof. Further, this function may be performed by a program or programs running on the supervisor and monitoring station or elsewhere, independently or in concert with other programs and/or human operators, thus providing an autonomic system implementing best practices or optimized protocols for the equipment under control.

Figure 5:
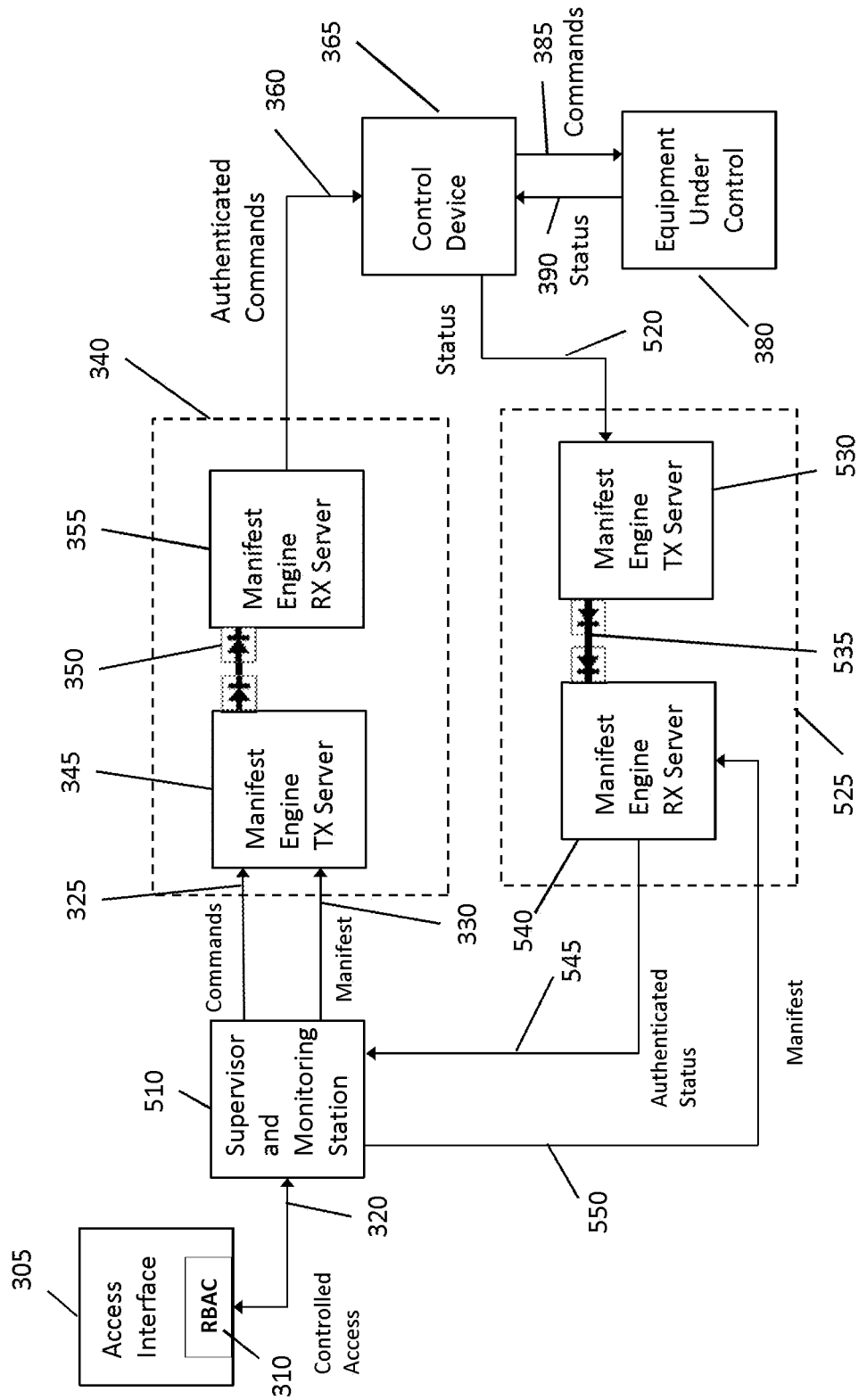
FIG. 5 is a block diagram of a third exemplary embodiment of the present invention.

FIG. 5 illustrates a second alternative embodiment 500 of the system 300 shown in FIG. 3. This alternative embodiment 500 operates in substantially the same way as system 400, but with a second manifest filter 525 being coupled between the control device 365 and the supervisor and monitoring station 510. The second manifest filter 525 has a TX server 530 coupled to receive status information from control device 365 via a link 520. TX server 530 passes received status information along the one-way link 535 to an RX server 540. RX server 540 receives a second manifest file from the supervisor and monitoring station 510 via link 550. The received status information is tagged or otherwise includes information identifying the type of status being transmitted. RX server 540 compares the received status information with the information in the second manifest file and only passes validated (or authorized) status information (i.e., that information expressly identified in the second manifest file) to the supervisor and monitoring station 510 via link 545. In this manner, this embodiment protects the control device (by ensuring that only validated commands are provided) and the supervisor and monitoring station 510 (by ensuring that only authenticated status information is provided).

The same advantages for closing the control loop exist in the FIG. 5 embodiment as with the FIG. 4 embodiment, with additional protection given to supervisor and monitoring station 510 by screening the incoming status information to verify that it originates in a valid control device 365.

Figure 6:
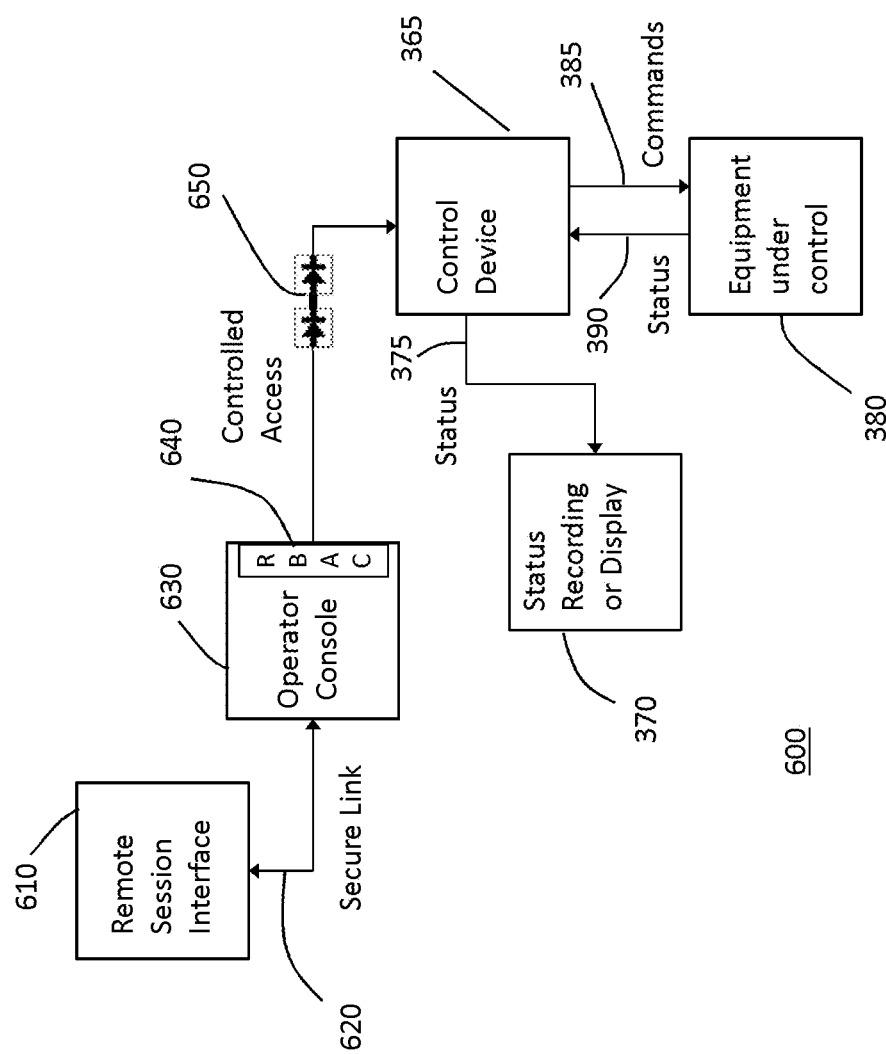
FIG. 6 is a block diagram of a fourth exemplary embodiment of the present invention.

Referring now to FIG. 6, an alternative embodiment is shown for providing controlled access to control device 365. In this embodiment, a user may generate a remote session via an interface 610 which is coupled to an operator console 630 via a secure link 620. For example, a user may connect to the operator console 630 via secure shell (SSH) connection, in which case the interface 610 is a computer running an SSH client and the operator console 630 is running an SSH server, with interface 610 coupled to operator console via a network 620. In this latter case, network 620 can be any type of network, including both a local area network (LAN) and a wide area network (WAN) such as the Internet. The user logs into the operating console 630 via the secure link, and the RBAC module 640 provides the user with access to a set of commands based upon the role assigned to such user (which, as discussed above, may be all possible commands for an administrator or a subset thereof for an operator). The properly issued commands may be provided to the control device via a one-way link 650, although, as one of ordinary skill in the art will readily recognize, in some cases the one-way link 650 may be omitted and a conventional two-way link used instead. This latter configuration may be deemed acceptable in some cases due to the security provided by the SSH connection.

The FIG. 6 embodiment provides the ability to issue properly authorized commands to the control device 365 from a remote session interface located anywhere network connectivity is possible. Additional security measures may be provided in this scenario, such as biometric devices, special authenticating devices or placement in a secure location, to prevent an attack by an impostor or someone forcing an authorized individual to perform operations under duress.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A system for securely transferring commands to a recipient control device, comprising:
an access interface configured to allow a user to enter a command, wherein the command comprises one of a set of commands for the recipient control device, wherein the user is assigned one of a predetermined set of roles, each role associated with a subset of the set of commands, wherein the access interface is configured to restrict the user to be able to enter only commands within the predetermined subset of commands associated with the assigned role;
a control interface coupled to receive information from the access interface, the information comprising the command entered by the user and the assigned role of the user, the control interface configured to output the information and a manifest table, the manifest table identifying each role and the subset of commands associated with each role; and
a manifest engine coupled to the control interface via a first communications link, the manifest engine comprising a manifest engine TX server computer and a manifest engine RX server computer coupled by a one-way data link in which data may only pass from an output of the manifest engine TX server computer to an input of the manifest engine RX server computer and an input of the manifest engine TX server computer configured to receive the information and the manifest table from the control interface via an input of the manifest engine, to compare the information with the contents of the received manifest table, and, if the command entered by the user corresponds to a command within the set of commands associated with the role assigned to the user, to forward the command on an output of the manifest engine RX server computer to the recipient control device, the output of the manifest engine RX server computer directly coupled to the recipient control device via a separate second communications link.

2. The system of claim 1, wherein the control interface has two outputs, a first output for outputting the information and a second output for outputting the manifest table; and wherein the manifest engine has two inputs, a first input coupled to the first output of the control interface to receive the information and a second input coupled to the second output of the control interface to receive the manifest table.

3. The system of claim 1, wherein recipient control device includes an output for providing status information, wherein the control interface is coupled to the output of the recipient control device via a separate connection, and wherein the control interface is configured to monitor the recipient control device based on status information received from the recipient control device.

4. The system of claim 3, wherein the separate connection is a one-way data link in which information may only pass from the output of the recipient control device to the control interface.

5. The system of claim 1, wherein the recipient control device has an output for providing status information, the system further comprising:
   a second manifest engine having a first input coupled to the output of the recipient control device, a second input coupled to receive a second manifest table from the control interface, the second manifest table identifying a predetermined set of status information and an output coupled to the control interface, the second manifest engine configured to compare the status information received from the recipient control device with the contents of the received second manifest table, and, if the status information corresponds to status information within the predetermined set of status information identified in the manifest table, to forward the status information on the output.

6. The system of claim 5, wherein the second manifest engine comprises:
   a second manifest engine TX server computer having an input coupled to the output of the recipient control device and an output, and configured to forward any status information received at the input to the output;
   a second data link having an input coupled to the output of the second manifest engine TX server computer and an output; and
   a second manifest engine RX server computer having a first input coupled to the output of the second data link, a second input coupled to the control interface and an output coupled to the control interface;
   wherein the second manifest engine RX server computer is configured to receive the second manifest table via the second input; and wherein the second manifest engine RX server computer is configured to receive status information forwarded by the second manifest engine TX server computer via the second data link and to compare the received status information with the contents of the received second manifest table and, if the received status information is identified in the second manifest table, to forward the received status information to the control interface via the output.

7. The system of claim 6, wherein the second data link is a one-way data link in which data may only pass from the input to the output.

* * * * *